United States Patent
Bui

(10) Patent No.: US 9,884,780 B2
(45) Date of Patent: Feb. 6, 2018

(54) WETLAND ROOF TECHNOLOGY FOR TREATING DOMESTIC WASTEWATER

(71) Applicant: Thanh Xuan Bui, Ho Chi Minh (VN)

(72) Inventor: Thanh Xuan Bui, Ho Chi Minh (VN)

(73) Assignee: TON DUC THANG UNIVERSITY, Ho Chi Minh (VN)

( * ) Notice: Subject to any disclaimer, the term of this patent is extended or adjusted under 35 U.S.C. 154(b) by 17 days.

(21) Appl. No.: 14/918,592

(22) Filed: Oct. 21, 2015

(65) Prior Publication Data

US 2017/0113956 A1    Apr. 27, 2017

(51) Int. Cl.
*C02F 3/32*        (2006.01)

(52) U.S. Cl.
CPC ........ *C02F 3/327* (2013.01); *C02F 2203/006* (2013.01)

(58) Field of Classification Search
CPC ....... C02F 3/327; C02F 3/288; C02F 2307/00
USPC ................. 210/602, 615, 616, 617
See application file for complete search history.

(56) References Cited

U.S. PATENT DOCUMENTS

| | | | | |
|---|---|---|---|---|
| 5,755,852 A | * | 5/1998 | Northrop | C02F 3/1215 210/602 |
| 8,298,423 B1 | * | 10/2012 | Jensen | C02F 3/322 210/259 |
| 2003/0024874 A1 | * | 2/2003 | Wallace | C02F 3/00 210/602 |
| 2009/0001002 A1 | * | 1/2009 | Bauer | C02F 3/046 210/138 |
| 2013/0098848 A1 | * | 4/2013 | Frigon | C02F 1/00 210/749 |
| 2014/0124420 A1 | * | 5/2014 | Kim | C02F 3/30 210/96.1 |

FOREIGN PATENT DOCUMENTS

DE         4339905 C1 * 11/1994
WO    WO 2011/012759 A1 *  2/2011

* cited by examiner

*Primary Examiner* — Fred Prince

(57) ABSTRACT

A wetland roof system and method for treating domestic waste water is disclosed which comprises a container having three sections and a L/W ratio greater than 10, a gravel layer deposited at the bottom of the container at a first thickness, a crushed stone layer deposited directly on top of the gravel layer having a second thickness, a sand layer deposited directly on top of the crushed stone layer having a third thickness, a soil layer deposited directly on top of the sand layer having a fourth thickness, and a plant layer growing from said soil layer at a predetermined density.

21 Claims, 2 Drawing Sheets

WETLAND ROOF TECHNOLOGY FOR TREATING DOMESTIC WASTEWATER

FIELD OF THE INVENTION

The present invention relates generally to the field of environmental technology. More specifically, the present invention relates to wetland roof system for treating effluent of septic tanks in urban areas.

BACKGROUND ART

There exist many conventional wetland roof (WR) systems around the world because there are real needs for clean environment such as clean water, clean air, and green living areas. However, none provides both domestic waste water treatment from effluent septic tanks and aesthetic decoration for houses in urban cities in developing countries such as Vietnam.

The WR system disclosed in CN102518265A is used to treat rainwater to meet the reuse standard. This conventional WR system includes a waterproof layer of roofing construction, laying across the root layer waterproof layer, layer on top of every root laying drainage channels, followed by the laying of eco-filler layer and mix the filler layer drainage channels, the mixed filler layer erection of water distribution supervisor and water distribution pipes. This WR system does not treat domestic waste water and fail to provide aesthetic beauty to houses in urban areas.

Yet in another conventional roof wetland system described in CN202391027U does not include any plants. Like the previous WR system, this roof wetland system is used to treat rainwater to meet the reuse standard. This WR system includes a budding roof, a waterproof layer, a root-proof layer, an ecological packing layer, a mixed packing layer, plant vectors. Again, this roof wetland system does not treat domestic waste water for reuse and does not provide any aesthetic values in urban areas.

The green roof system described in CN 101538915A only treats rainwater. It collects rainwater and circle such water for irrigation purpose. The green roof system includes roofing, planting layer, a joint all-welded stainless steel waterproof layer on the roof covering, the planting layer on the stainless steel waterproof layer. It does not have any plants for environmental benefits and aesthetic values. In addition, it does not treat domestic waste water.

Therefore what is needed is a wetland roof system capable of treating domestic waste water and providing aesthetic and environmental values to houses in urban areas.

SUMMARY OF THE INVENTION

Accordingly, an objective of the present invention is to provide a wetland roof system and method which provide solutions to the problems described above. Thus, a wetland roof system and method for treating domestic waste water is disclosed, which includes: a container having three sections and a L/W ratio greater than 10, a gravel layer deposited at the bottom of the container at a first thickness, a crushed stone layer deposited directly on top of the gravel layer having a second thickness, a sand layer deposited directly on top of the crushed stone layer having a third thickness, a soil layer deposited directly on top of the sand layer having a fourth thickness, and a plant layer growing from said soil layer at a predetermined density.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
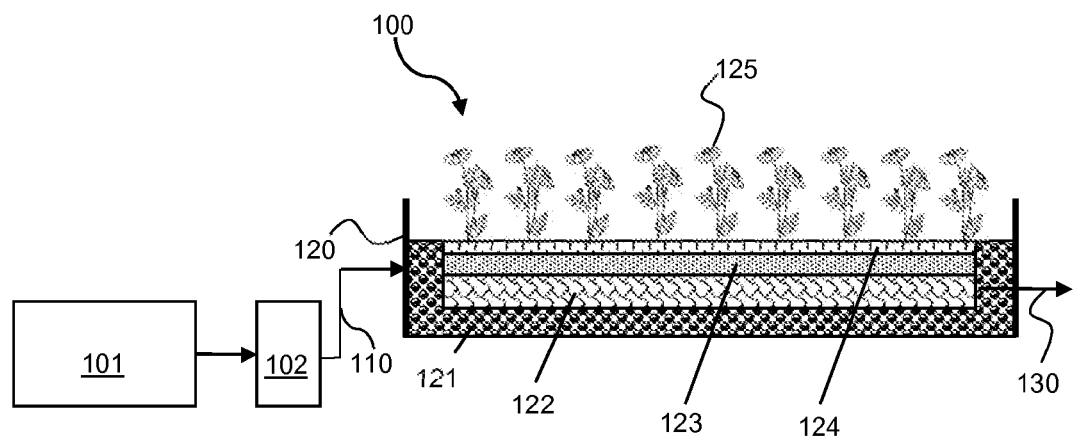
FIG. 1 is a diagram illustrating a wetland roof system for treating domestic waste water in accordance with an embodiment of the present invention.

Now referring to FIG. 1 which illustrates a wetland roof system 100 for treating domestic waste water in accordance with an embodiment of the present invention. An essential element of wetland roof system 100 is a container 120 which is placed on a roof of a house (not shown). In a preferred embodiment, container 120 has a length L and a width W and a L/W ratio greater than 10. On the bottom of container 120, a gravel layer 121 is deposited which has a first thickness $t_1$. Next, a crushed stone layer 122 having a second thickness $t_2$ is deposited directly on top of gravel layer 121. A sand layer 123 having a third thickness $t_3$ is deposited directly on top of sand layer 122. A soil layer 124 having a fourth thickness $t_4$ is directly deposited on top of soil layer 123. Finally, plants 125 which has the capability of treating waste water are grown at a predetermined density $d_1$. In one embodiment, plants 125 are selected among a group of asteraceae. In the preferred embodiment, plants 125 are *melampodium paludosum* and are maintained at 20-40 mm in height.

Continuing with FIG. 1, at the input and output sides of container 120, gravel layer 121 is completely deposited without crushed stone layer 122, sand layer 123, and soil layer 124 so that waste water is not clogged there. In addition, container 120 is raised at the input side at an angle α where $$\tan\alpha = \frac{1}{100}$$

so that waste water can seep slowly from the input side to the output side.

Still continuing to FIG. 1, in a preferred embodiment, the first thickness $t_1$ of gravel layer 121 is 50 mm. The second thickness $t_2$ of crushed rock layer 122 is 120 mm. The third thickness $t_3$ of sand layer 123 is 20 mm. The fourth thickness $t_4$ of soil layer 124 is 10 mm. Plants 125 are grown preferably at density around 200 plants/m². Finally, in one embodiment, container 120 has a length of 1.8 m, a width of 0.6 m, and a height of 0.15 m (or 150 mm). However, depending on the roof size, container 120 dimensions can vary to cover the roof as long as the length over width ratio is greater than 10. In one embodiment, container 120 is made from tin, HDPE, plastic, or composite materials.

Still referring to FIG. 1, container 120 is connected to a septic tank 101 where all the domestic waste water are stored. All home utilities (not shown) that provide clean water to the house are connected to septic tank 101 via aqua duct system (not shown) so that waste water after used are stored in septic tank 101. At the output side of septic tank 101, a water pump 102 is used to pump domestic waste water into the input side of container 120 via first connector 110. In one embodiment, domestic waste water can be input directly into the gravel inlet zone. On the opposite side of container 120, a second connector 130 leads treated water into a storage (not shown). In one embodiment, water pump 102 is controlled so that the flow rate of waste water inside container 120 is constant. Yet in one embodiment, an effluent valve located at a height of 100 mm to maintain the water level inside container 120 at 100 mm during operation.

Figure 2:
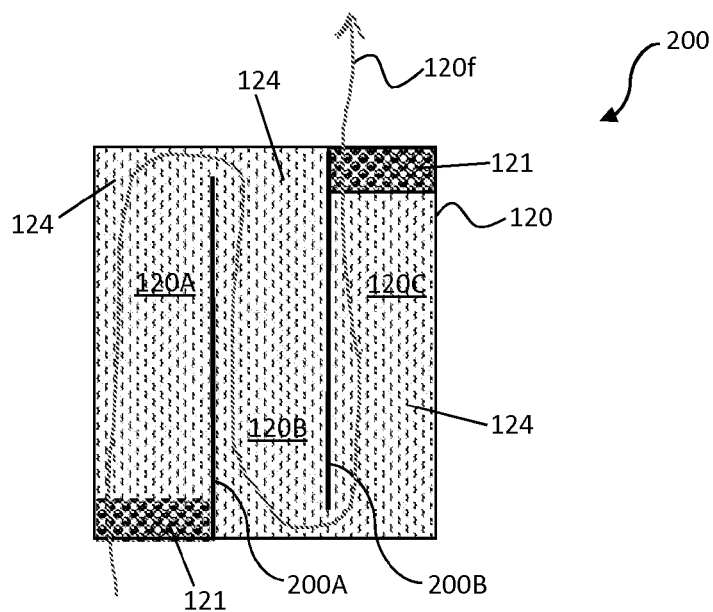
FIG. 2 is a top view perspective of the wetland roof system for treating domestic waste water illustrating the internal structure and direction of waste water flow of a container in accordance with an embodiment of the present invention.

Referring next to FIG. 2 which illustrates a top view 200 of container 120 as described in FIG. 1. As shown, container 120 has a first wall 200A and a second wall 200B dividing container 120 into a first section 120A, a second section 120B, and a third section 120C. First wall 200A begins at the input side but does not touch the output side of container 120 so that there exists a first gap for water to flow through first section 120A and second section 120B. On other hand, second wall 200B begins at the output side but does not touch the input side of container 120 so that there exists a second gap for waste water to flow through second section 120B and third section 120C. In one embodiment, the first gap and the second gap each equals to the width of first section 100A, a second section 120B, and third section 120C. The inclination of container 120 at the angle α described above also contribute to water flow direction 120f from first section 120A, second section 120B, and third section 120C. As shown in FIG. 2, gravel layer 121 is completely deposited at the input side of first section 120A and at the output side of third section 120C. At these two ends, other layers such as crushed stone layer 122, sand layer 123, and soil layer 124 are not used. In other words, gravel layer 124 is deposited from the bottom of container 120 all the way to flush with the top surface of soil layer 124 as shown in FIG. 2.

In operation, domestic waste water is pumped from the last compartment of septic tank 101 to a reservoir (not shown) on the roof. Then, the waste water from the reservoir (not shown) is distributed to first section 120A of wetland roof system 100 by water pump 102. In one embodiment, water pump 102 is a dosing pump. Waste water flows 120f from first section 120A through second section 120B and into third section 120C. Then, treated water gets out at the output connector 130 (water collecting tube) at the other end of third section 120C. Finally, treated water is collected in a storage tank (not shown).

Figure 3:
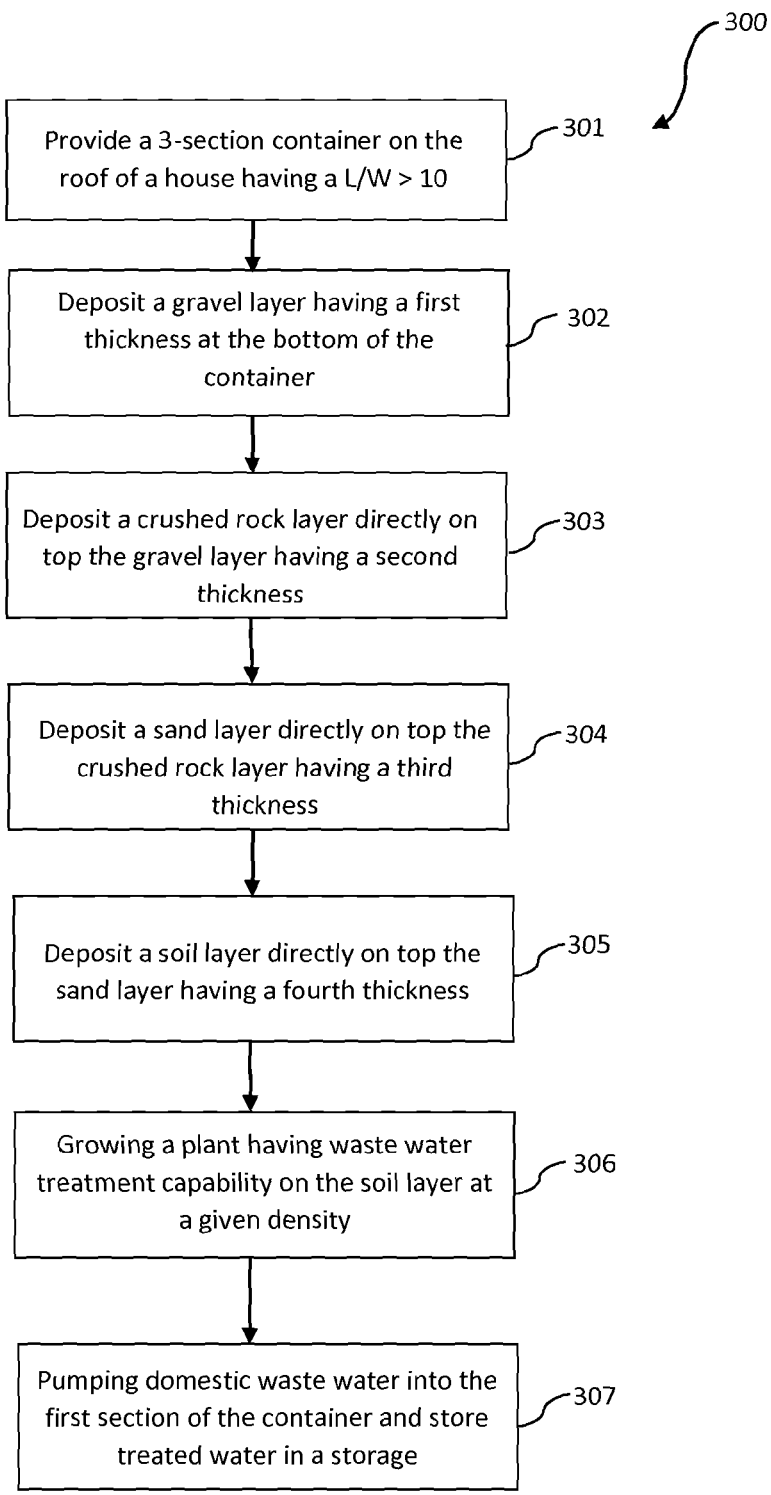
FIG. 3 is a method for treating domestic waste water in accordance with an embodiment of the present invention.

Now referring to FIG. 3 which illustrates a method 300 for treating domestic waste water using wetland roof technology. In method 300, particular deposit layers at specific depths are used and specific type of plants are grown to provide efficient water use and add environmental aesthetic to the neighborhood.

At step 301, a container having a length and width with a L/W ratio of greater than 10 is built depending on the dimension of the roof. In one embodiment, the container is built so that it has three sections. Step 301 is realized by container 120 described above. Container 120 has first section 120A, second section 120B, and third section 120C by virtue of first wall 200A and second wall 200B. However, container 120 of the present invention is not limited to three sections as described above in FIG. 1 and FIG. 2 above. It is understood by a person of ordinary skill in the art that container 120 can be divided into many odd sections depending on the dimensions of the wetland roof.

Next, at step 302, a gravel layer having a first thickness $t_1$ is deposited on the bottom of container throughout all the sections. Step 302 is realized by depositing gravel layer 121 on the bottom of container 120 throughout first section 120A, second section 120B, and third section 120C. Please refer to the descriptions of FIG. 1 and FIG. 2 above. In one embodiment, the first thickness of gravel layer 121 is 50 mm.

Next, at step 303, a crushed stone layer having a second thickness $t_2$ is deposited directly on top of the gravel layer throughout all the sections. Step 303 is realized by depositing crushed stone layer 122 directly on top of gravel layer 121 throughout first section 120A, second section 120B, and third section 120C. Please refer to the descriptions of FIG. 1 and FIG. 2 above. In one embodiment, the second thickness of crushed stone layer 122 is 120 mm. Yet in one embodiment, the crushed stone layer 122 is not deposited at the input side of first section 120A and at the output side of third section 120C.

Next, at step 304, a sand layer having a third thickness $t_3$ is deposited directly on top of the crushed stone layer throughout all the sections. Step 304 is realized by depositing sand layer 123 directly on top of crushed stone layer 122 throughout first section 120A, second section 120B, and third section 120C. Please refer to the descriptions of FIG. 1 and FIG. 2 above. In one embodiment, the third thickness of sand layer 123 is 20 mm. Yet in one embodiment, the sand layer 123 is not deposited at the input side of first section 120A and at the output side of third section 120C.

At step 305, a soil layer having a fourth thickness $t_4$ is deposited directly on top of the crushed stone layer throughout all the sections. Step 305 is realized by depositing soil layer 124 directly on top of sand layer 123 throughout first section 120A, second section 120B, and third section 120C. Please refer to the descriptions of FIG. 1 and FIG. 2 above. In one embodiment, the fourth thickness of sand layer 123 is 20 mm. Yet in one embodiment, the soil layer 124 is not deposited at the input side of first section 120A and at the output side of third section 120C.

At step 306, plants having waste water treatment capability are grown at a given density. Step 306 is realized by plants 125 described in FIG. 1 above. In one embodiment, plants 125 are selected among a group of asteraceae. In the preferred embodiment, plants 125 are *melampodium poludosum* and are maintained at 20-40 mm in height.

Finally, at step 307, domestic waste water from septic tank is pumped into the first section of container and stored at a reservoir connected to the third section of container. In the present invention, step 307 is realized by septic tank 101, dosing pump 102, input connector 110, container 120, and output connector 130. A reservoir (not shown) is used to store treated water for reuse. The operation of step 307 is described in details in FIG. 2 above.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A wetland roof system for treating domestic waste water, comprising:
    a container comprising a first section, a second section, and a third section formed by a first divider and a second divider, wherein said first divider starts from one side but does not touch an opposite side of said container, and said second divider starts from the opposite side but does not touch the one side of said container so that said domestic waste water flows from said first section to said third section, said container having a length and a width whose length to width ratio is greater than 10, wherein said domestic waste water is pumped into said first section and extracted from said third section;
    a gravel layer deposited at the bottom of said container at a first thickness;
    a crushed stone layer deposited directly on top of said gravel layer having a second thickness;
    a sand layer deposited directly on top of said crushed stone layer having a third thickness;
    a soil layer deposited directly on top of said sand layer having a fourth thickness; and
    a plant layer growing from said soil layer at a predetermined density.

2. The wetland roof system of claim 1 wherein said first thickness is 50 mm, said second thickness is 120 mm, said third thickness is 20 mm, and said fourth thickness is 10 mm.

3. The wetland roof system of claim 1 wherein said container has a length of 1.8 meters, a width of 0.6 meter, and a height of 0.15 meter.

4. The wetland roof system of claim 1 wherein said gravel layer is completely deposited at the beginning of said first section and at the end of said third section without said gravel layer, said soil layer, and said crushed stone layer to avoid clogging of said waste water flow.

5. The wetland roof system of claim 1 wherein said plant layer is selected from a group of asteraceae having the capability of treating waste water.

6. The wetland roof system of claim 1 wherein said container is set at an angle $\alpha$ whose tan $\alpha$ equals to 1/100.

7. The wetland roof system of claim 6 wherein said plant layer is *melampodium paludosum*.

8. The wetland roof system of claim 1 wherein said plant layer is kept at a height between 20-40 cm, and a density of at least 200 plants per m2.

9. The wetland roof system of claim 1 wherein the water level is maintained at the height of 100 mm from the bottom of said container during operation by means of an effluent valve located at said height.

10. A method for treating domestic waste water, comprising:
    providing a container on a rooftop of a house, said container comprising a first section, a second section, and a third section formed by a first divider and a second divider, wherein said first divider starts from one side but does not touch an opposite side of said container, and said second divider starts from the opposite side but does not touch the one side of said container so that said domestic water flows from said first section to said third section, said container having a length and a width whose length to width ratio is greater than 10;
    lifting said container at said first section at angle a whose tan a equals to 1/100;
    depositing a gravel layer at the bottom of said container at a first thickness;
    depositing a crushed stone layer directly on top of said first layer having a second thickness;
    depositing a sand layer directly on top of said crushed stone layer having a third thickness; and
    depositing a soil layer directly on top of said sand layer having a fourth thickness;
    growing a plant layer from said soil layer at a predetermined density; pumping waste water into said first section of said container; and
    extracting treated water at the opposite side at said third section of said container.

11. The method of claim 10 wherein said first thickness is 50 mm, said second thickness is 120 mm, said third thickness is 20 mm, and said fourth thickness is 10 mm.

12. The method of claim 10 wherein said container has a length of 1.8 meters, a width of 0.6 meter, and a height of 0.15 meter.

13. The method of claim 10 wherein said gravel layer is completely deposited at the beginning of said first section and at the end of said third section without said gravel layer, said soil layer, and said crushed stone layer to avoid clogging of said waste water flow.

14. The method of claim 10 wherein said plant layer is selected from a group of asteraceae having the capability of treating waste water.

15. The method of claim 14 wherein said plant layer is *melampodium paludosum*.

16. The method of claim 10 wherein said plant layer is kept at a height between 20-40 cm, and a density of at least 200 plants per m2.

17. The method of claim 10 wherein said container is inclined at an angle $\alpha$ whose tan $\alpha$ equals to 1/100.

18. The method of claim 10 wherein the water level is maintained at the height of 100 mm from the bottom of said container during operation.

19. A home waste water treatment system, comprising:
    a plurality of utility units operative to provide water for users and to discharge waste water after used;
    a septic tank connected to said plurality of utility units operable to store said waste water;
    a container comprising a first section, a second section, and a third section formed by a first divider and a second divider, wherein said first divider starts from one side but does not touch an opposite side of said container, and said second divider starts from the opposite side but does not touch the one side of said container so that said domestic waste water flows from said first section to said third section, said container having a length and a width whose length to width ratio is greater than 10, wherein said container is set on a rooftop of the house at an angle a whose tan a equals to 1/100;

a gravel layer deposited at the bottom of said container at a first thickness;

a crushed stone layer deposited directly on top of said gravel layer having a second thickness;

a sand layer deposited directly on top of said crushed stone layer having a third thickness;

a soil layer deposited directly on top of said sand layer having a fourth thickness; a plant layer growing from said soil layer at a predetermined density;

a water pump connected to said septic tank operable to pump said waste water into said container at said first section; and a storage, connected to said third section of said container, operable to store water outputting from said container at said third section.

20. The home waste water treatment system of claim 19 wherein said plant layer is selected from a group of asteraceae having the capability of treating waste water.

21. The home waste water treatment system of claim 19 wherein said plant layer is *melampodium paludosum* capable of treating said waste water and said plant layer is maintained at a height between 20-40 cm, and a density of at least 200 plants per m2.

* * * * *